No. 626,066. Patented May 30, 1899.
F. HURLBUT.
ATTACHMENT FOR DENTAL SPITTOONS.
(Application filed July 20, 1898.)
(No Model.) 2 Sheets—Sheet 1.
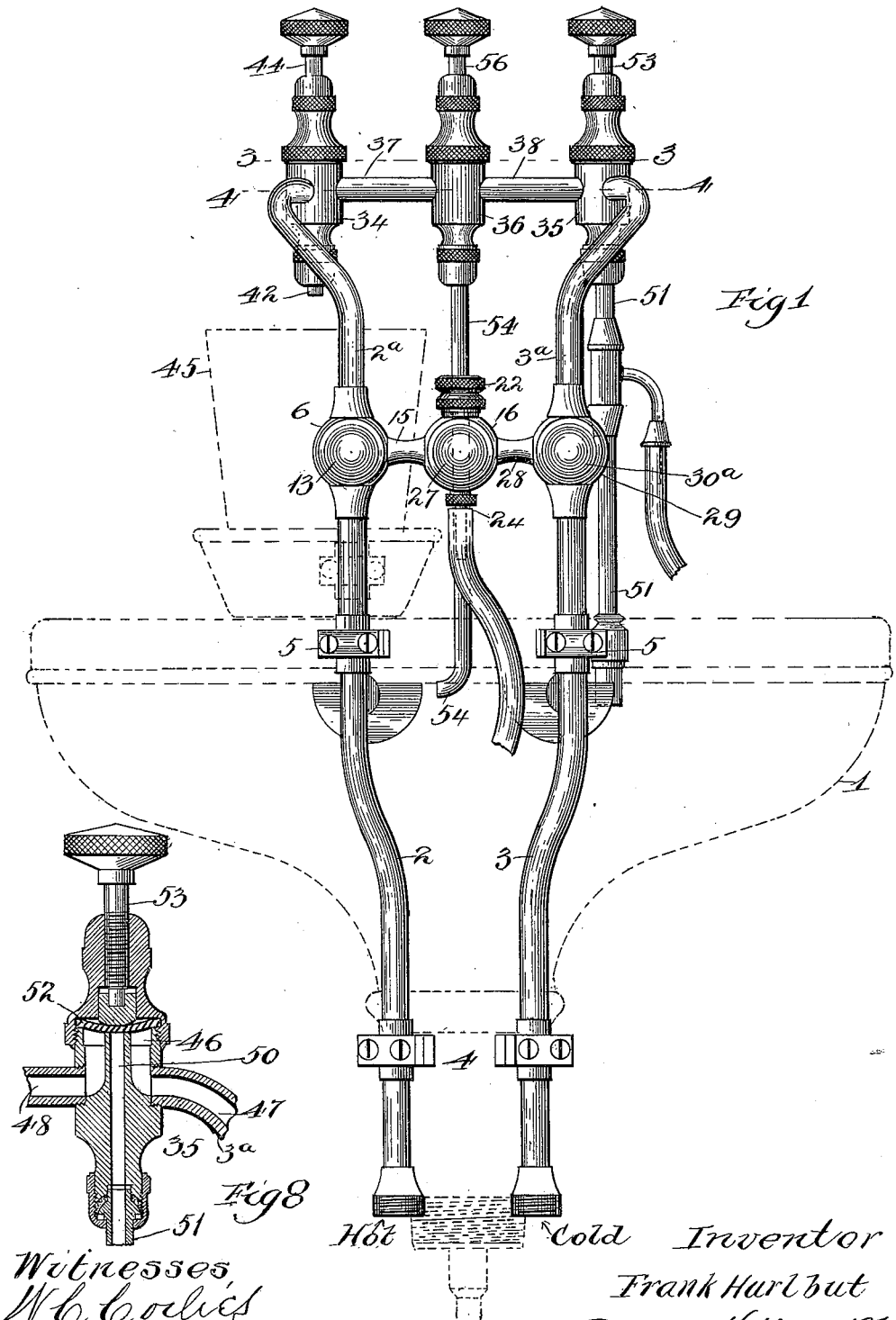

No. 626,066. Patented May 30, 1899.
F. HURLBUT.
ATTACHMENT FOR DENTAL SPITTOONS.
(Application filed July 20, 1898.)
(No Model.) 2 Sheets—Sheet 2.
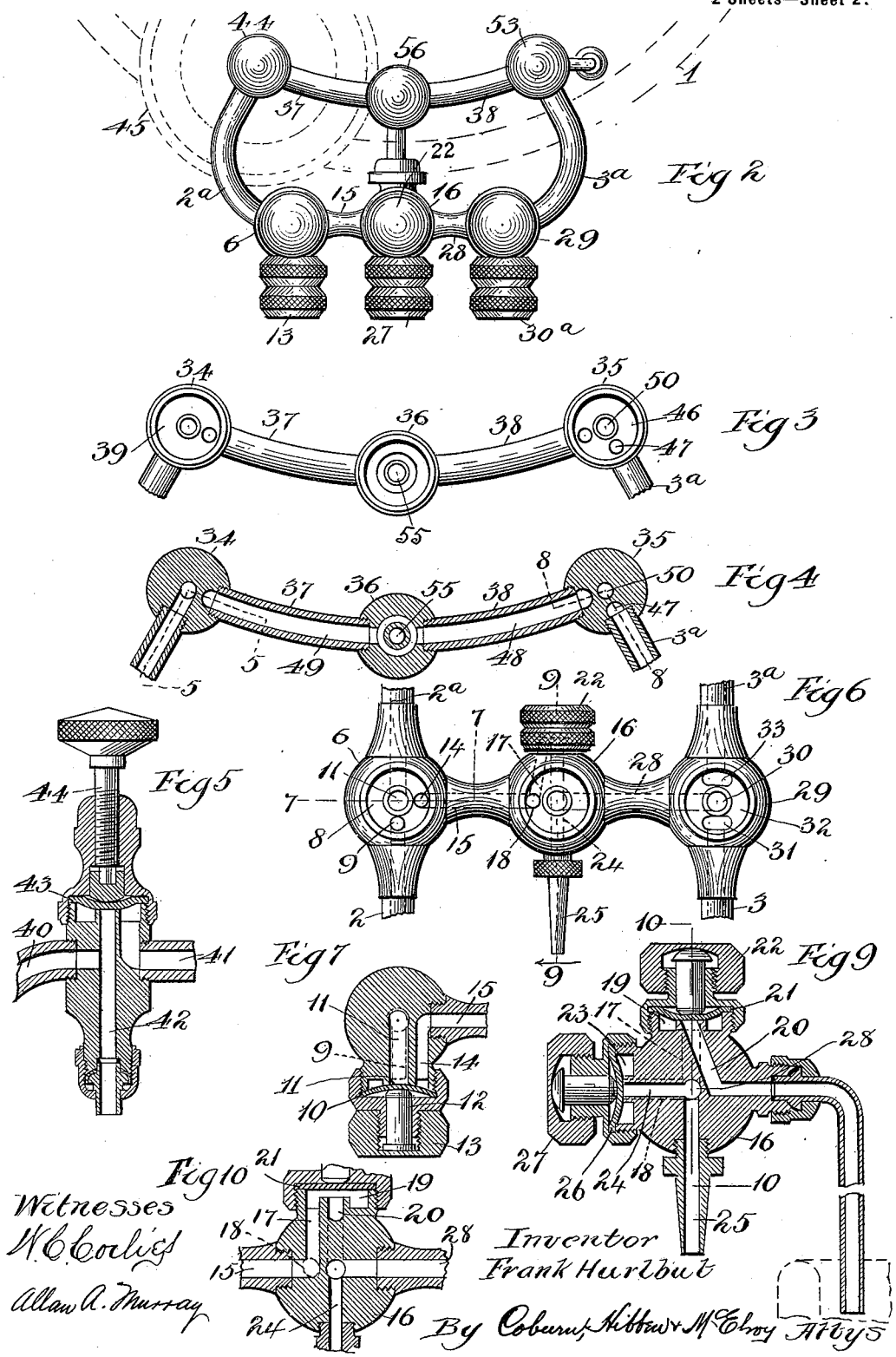
Witnesses
W. C. Coolies
Allan A. Murray
Inventor
Frank Hurlbut
By Coburn, Hibben & McElroy Attys

UNITED STATES PATENT OFFICE.

FRANK HURLBUT, OF CHICAGO, ILLINOIS, ASSIGNOR TO ALBERT C. CLARK, OF SAME PLACE.

ATTACHMENT FOR DENTAL SPITTOONS.

SPECIFICATION forming part of Letters Patent No. 626,066, dated May 30, 1899.

Application filed July 20, 1898. Serial No. 686,431. (No model.)

*To all whom it may concern:*

Be it known that I, FRANK HURLBUT, a citizen of the United States, residing at Chicago, in the county of Cook and State of Illinois, have invented certain new and useful Attachments for Dental Spittoons, of which the following is a specification.

My invention relates to dental spittoons; and its particular object is to provide means in connection therewith for supplying either hot or cold water or mingled hot and cold water to the various attachments and devices coöperating with such spittoon.

In the drawings, Figure 1 is a view in elevation of a spittoon with my attachment secured thereto; Fig. 2, a plan view thereof; Figs. 3 and 4, sectional plans on lines 3 and 4, respectively, of Fig. 1; Fig. 5, an enlarged section on irregular line 5 5 of Fig. 4; Fig. 6, a detail elevation; Fig. 7, a section on line 7 of Fig. 6; Fig. 8, a section on irregular line 8 8 of Fig. 4; Fig. 9, a section on line 9 of Fig. 6, and Fig. 10 a section on line 10 of Fig. 9.

Upon the outside of the bowl 1 of the spittoon are attached a hot-water pipe 2 and a cold-water pipe 3 by any suitable means, such as the brackets or clamps 4 and 5. Those pipes of course lead, respectively, from suitable supplies of hot and cold water and extend above the level of the bowl. Upon substantially the same plane the pipes 2 and 3 are provided with enlargements or valve-casings containing valve devices for the regulation or admission of the water. The hot-water pipe 2 communicates with a chamber 8 through a passage 9, but the water is prevented from entering the portion $2^a$ of the pipe 2 thereabove by the diaphragm or disk 10, which is located in casing 6 and which is normally held seated in the passage 11 by the pin or plug 12, pressed inwardly by the screw 13. When the screw is screwed up, as shown in Fig. 7, the supply of water to the pipe $2^a$ will be cut off, but the water will be free to pass from chamber 8 through the port 14 and passage 15 to a valve-casing 16, situated between the pipes 2 and 3. This passage 15 enters the casing 16, where it divides into two branches 17 and 18, respectively. The branch 17 leads into a chamber 19, which has an outlet port and passage 20, emptying into the bowl and governed by the disk-valve 21, actuated by the nut and plug 22. The branch 18 enters a chamber 23, and the outlet-passage 24 therefrom to the nozzle 25 for the usual syringe is governed by the disk-valve 26, governed by the nut and plug 27. The valve 26, as well as valve 21, is normally closed, as shown in Fig. 9, so that water from the hot-water connection is present in branches 17 and 18 up to such valves. The opening of valve 21 will cause the water to flow directly to the bowl, so that the water which has stood in the pipes, &c., will drain out and the water will then run hot, as desired, for use in the syringe. When the valve 26 is now opened and valve 21 closed, the water will flow through the nozzle 25.

A pipe or passage 28 from the cold-water pipe enters casing 16 and communicates with the passage 24, so that either hot or cold water, or both, may be supplied to the syringe. The valve for governing this flow of cold water is contained in a casing 29, which has a valve-governed central passage 30, communicating with the passage 28. The cold water passes freely through the port 31, chamber 32, and port 33 to the portion $3^a$ of the cold-water pipe, and its admission into the passage 30 is governed by a valve $30^a$, similar to the valve 10. It will thus be seen that the hot water is always present as far as the casing 16, but that the cold water is cut off from the syringe device at the casing 29. The opening of the valve 26 in the casing 16 will supply hot water alone to the syringe, and the simultaneous opening of the valve in the casing 29 will supply tempered or mingled hot and cold water to the syringe. If the valve in the casing 29 be opened, the valve in the casing 16 being closed, cold water alone will be supplied to the syringe.

The hot and cold water pipes extend upward and are each provided with valve-casings 34 and 35, respectively, connected to an intermediate casing 36 by pipes 37 and 38, respectively. The casing 34 has a chamber 39 with a hot-water-inlet port and passage 40 and a cold-water inlet or port 41 and with an outlet 42 in the nozzle, which nozzle-outlet is governed by a diaphragm 43, operated by a screw 44, similar to those already alluded to. This nozzle supplies water to the usual glass 45, as required in dentistry.

The cold-water passage in pipe 3ª enters chamber 46 in casing 35 through port or passage 47 and is free to pass through port or passage 48, traversing casing 36 and passage 49. It then enters casing 34, from which cold water may be drawn into the glass upon the opening of the valve 43. The outlet 50 of the casing 35 communicates with the pipe 51 of the usual and well-known saliva-ejector device, and cold water may be admitted thereto for its operation by the opening of a valve 52, actuated by the nut or screw 53, as shown in Fig. 8.

The pipe 54, connected to casing 36, is the supply-pipe for the ejector device adapted to drive the inner bowl where an inner rotatable bowl is employed or to supply water to a single bowl. This ejector or supply-pipe has a passage 55, which is governed by a screw 56, operating a valve similar to valve 43.

Hot water is normally closed off at valve 10, but cold water is normally free to pass upwardly through casings 35 and 36 to casing 34, where it is discharged through outlet 42 and is normally cut off by the valve 43. When such valve is open, the valve 10 being closed, cold water alone is admitted to the glass, and when valve 10 is simultaneously opened both hot and cold water are supplied. When valve 43 is closed and valve 10 opened, hot water alone will be discharged into the glass. When the valves in the casings 35 and 36 are opened, cold water alone is discharged through the devices connected with each respectively.

Although I have chosen to attach the respective attachments or devices to which water is supplied at the points as shown and specified, it will be understood that their location may be changed or that one of such devices may be substituted in the place of the other.

Although I have described more or less precise forms and details of construction, I do not wish to be understood as limiting myself thereto, as I contemplate changes in form, the proportion of parts, and the substitution of equivalents as circumstances may suggest or render expedient and without departing from the spirit of my invention.

I claim—

1. A dental-spittoon attachment, comprising, in combination with the bowl, a hot-water pipe, a cold-water pipe, a valve in said cold-water pipe governing the flow of cold water, a valve-casing communicating with both the hot and cold water pipes through passages 15 and 28 respectively, and having an outlet-passage 24 for supplying a syringe, glass or the like, an outlet-pipe 20 for draining off stagnated water of the hot-water pipe, said casing having a chamber 19 communicating with outlet 20 and with a passage 17 communicating with passage 15 and also having a chamber 23 communicating with passage 24 and with a passage 18 leading from passage 15, said passage 28 communicating in the casing with passage 24, a valve 21 governing communication in chamber 19 between passages 17 and 20 and a valve 26 governing communication in chamber 23 between passages 18 and 24.

2. A dental-spittoon attachment comprising, in combination with the bowl, a hot-water pipe, a cold-water pipe, two cross-pipes between the hot and cold water pipes, a syringe device connected to one of such cross-pipes, a valve on such last-named cross-pipe for admitting hot water to the syringe, a valve on the cold-water pipe for admitting cold water alone to the syringe when the other valve is closed, a nozzle or pipe connected with the second cross-pipe and adapted to supply cold water only to the bowl, a valve for admitting water from such cross-pipe through the nozzle, a saliva-ejector device connected to the cold-water pipe, a valve for admitting water from the cold-water pipe to the ejector, a device or nozzle for supplying water to a glass or the like and arranged at the junction of the second cross-pipe and the hot-water pipe, a valve for admitting cold water to the glass and a valve in the hot-water pipe for admitting hot water to such glass whereby either hot or cold water or both may be supplied to the glass.

3. A hot and cold water supply attachment for dental spittoons comprising a hot and a cold water pipe, connected together at their top, a water-outlet device arranged between the pipes intermediate of their length, branch pipes and passages connecting such device with the hot and cold water pipes respectively, a valve for said device to regulate the outlet, a valve in the cold-water pipe for admitting cold water to said device, the branch pipe from the hot-water pipe being in continual connection with the said device, a valve in the hot-water pipe for governing the admission of hot water thereabove, a water-supply device for supplying water to a glass or the like and arranged at the end of the hot-water pipe and in continual communication with the cold-water pipe, valves for supplying either hot or cold water or both simultaneously, a valve-controlled water-outlet device for supplying cold water to the bowl and arranged on the cold-water pipe and a valve-controlled device for supplying cold water to a saliva-ejector.

4. An attachment for dental spittoons comprising a hot-water pipe 2, a cold-water pipe 3, a valve-casing in the hot-water pipe containing a chamber 8 having an inlet-port 9, an outlet-port 11, a branch outlet-port 14, a casing 16 having a chamber 23 with a hot-water inlet 17 communicating with port 14 by passage 15, a valve governing inlet 17 and normally closing the same, an outlet-port 24 from chamber 23, a cold-water-inlet port and passage 28, a casing 29 connecting with pipe 3 and having a chamber 32 and a branch outlet-port 30 leading to the passage 28, a valve governing port 30 and normally holding it closed, a valve 10 governing outlet-port 11 and adapted to supply hot water thereabove through the discharge-outlet 42, a casing 35 on the cold-water pipe having a chamber 46 with a water-inlet 47 and passage 48, a discharge-passage 50, a valve governing such passage 50, a casing 36, communicating with passage 48 extending therethrough and communicating with the passage 49, said casing 36 having a discharge-outlet 54, a valve governing such outlet 54, a casing containing said discharge-outlet 42 and communicating with the passage 49 and a valve 43 for governing the flow of cold water from passage 49 through discharge-outlet 42.

5. The combination in a dental spittoon of a hot-water pipe 2 and cold-water pipe 3 connected at their upper ends by branch pipes 37 and 38, a syringe device or the like connected to the hot and cold water pipes by passages 15 and 28 respectively, valves in the pipes 2 and 3 and also in the syringe device for governing the flow of water, a casing 35 connected with pipe 3, a saliva-ejector device 51 communicating therewith, a supply device 36 having an outlet 54 for the spittoon proper, a supply device 34 having an outlet 42 for supplying the usual glass with water, said parts 34 and 35 being arranged at the junction of the pipes 2 and 3 with the branch pipes 37 and 38 respectively and the device 34 being arranged upon the branch connection 37 38.

FRANK HURLBUT.

Witnesses:
ALLAN A. MURRAY,
LOUISE E. SERAGE.